(12) United States Patent
Shida et al.

(10) Patent No.: US 7,604,842 B2
(45) Date of Patent: Oct. 20, 2009

(54) ELECTRODE MANUFACTURING APPARATUS AND METHOD OF MANUFACTURING ELECTRODE

(75) Inventors: Masayuki Shida, Fukushima (JP);
Sachio Akahira, Fukushima (JP);
Osamu Tahara, Fukushima (JP);
Takanobu Yoshino, Fukushima (JP)

(73) Assignee: Sony Corporation, Tokyo (JP)

( * ) Notice: Subject to any disclaimer, the term of this patent is extended or adjusted under 35 U.S.C. 154(b) by 517 days.

(21) Appl. No.: 10/382,268

(22) Filed: Mar. 5, 2003

(65) Prior Publication Data
US 2003/0232127 A1    Dec. 18, 2003

(30) Foreign Application Priority Data
Mar. 8, 2002    (JP)    ............... 2002-063239

(51) Int. Cl.
*B05D 3/12*    (2006.01)
*B05D 5/12*    (2006.01)
(52) U.S. Cl. .................. 427/356; 427/58; 427/115; 427/355
(58) Field of Classification Search ............ 427/58, 427/355, 356, 115; 118/410; 425/461, 467
See application file for complete search history.

(56) References Cited

U.S. PATENT DOCUMENTS

| | | | | |
|---|---|---|---|---|
| 5,368,893 A | * | 11/1994 | Sommer et al. | 427/348 |
| 5,399,196 A | * | 3/1995 | Ichikawa et al. | 118/407 |
| 5,456,944 A | * | 10/1995 | Trest et al. | 427/128 |
| 5,824,156 A | | 10/1998 | Watanabe et al. | |
| 5,882,407 A | * | 3/1999 | Takeno et al. | 118/419 |
| 5,989,622 A | * | 11/1999 | Iwashita et al. | 427/58 |
| 6,280,879 B1 | * | 8/2001 | Andersen et al. | 429/233 |
| 6,284,405 B2 | * | 9/2001 | Kaido et al. | 429/94 |
| 6,306,215 B1 | * | 10/2001 | Larkin | 118/249 |
| 6,314,638 B1 | * | 11/2001 | Kaido et al. | 29/730 |
| 6,641,671 B2 | * | 11/2003 | Shinozaki et al. | 118/684 |
| 2001/0012588 A1 | | 8/2001 | Kaido et al. | |

* cited by examiner

*Primary Examiner*—Brian K Talbot
(74) *Attorney, Agent, or Firm*—Robert J. Depke; Rockey, Depke & Lyons, LLC

(57) ABSTRACT

Provided are an electrode manufacturing apparatus and a method of manufacturing an electrode in which an electrode capable of preventing the occurrence of an internal short circuit is manufactured. A current collector is passed through a coating position in a downward direction by a reference roll. Thereby, just after coating of a mixture is interrupted, a built-up mixture between the current collector and a coating outlet is pulled in a downward direction by the current collector, so the position of the built-up mixture is lower than the position of the coating outlet. Therefore, the adhesion of the mixture to the coating outlet can be prevented, and as a result, a non-forming region where no mixture is formed can be prevented from being coated with the mixture.

18 Claims, 11 Drawing Sheets

ELECTRODE MANUFACTURING APPARATUS AND METHOD OF MANUFACTURING ELECTRODE

This application claims priority to Japanese Patent Application Number JP2002-063239 filed Mar. 8, 2002, which is incorporated herein by reference.

BACKGROUND OF THE INVENTION

1. Field of the Invention

The present invention relates to an electrode manufacturing apparatus and a method of manufacturing an electrode in which an electrode comprising a mixed layer disposed on a current collector is manufactured.

2. Description of the Related Art

In recent years, research and development of secondary batteries used as power sources for portable electronic equipment such as cellular phones have been actively advanced. Among the second batteries, attention is given to lithium-ion secondary batteries as batteries in which a high energy density can be achieved.

As the lithium ion secondary batteries, for example, a battery with a winding structure in which a laminate including a positive electrode and a negative electrode with an electrolyte in between is wound is well known. As the positive electrode and the negative electrode, for example, an electrode comprising a mixed layer selectively formed on a current collector made of metallic foil is used. The mixed layer is a region involved in battery reaction, and a region where the mixed layer is not formed (hereinafter simply referred to as "non-forming region") is an absolutely necessary region for attaching a lead for extracting current to outside.

The positive electrode and the negative electrode of this kind are formed through selectively forming the mixed layer on a long current collector by use of an electrode manufacturing apparatus, and then cutting the current collector so as to have predetermined dimensions in directions of the length and the width. As the electrode manufacturing apparatus, for example, an apparatus which intermittently coats a mixture on the current collector from a coating head so as to form the mixed layer in a state that the current collector is continuously transferred is cited. As a mechanism which intermittently coats the mixture by the coating head, for example, a mechanism which intermittently interrupts the supply of the mixture to the coating head, a mechanism in which the coating head is attached to and detached from the current collector, a mechanism using a combination of these mechanisms and so on are well known.

However, in a conventional electrode manufacturing apparatus, when the mixed layer is formed on the current collector by the coating head, the mixture coated by the coating head may be adhered to a mixture coating end portion or the non-forming region mainly resulting from an operating mechanism of the electrode manufacturing apparatus. In this case, the mixed layer is formed on the non-forming region, thereby resulting in a factor causing an internal short circuit in the battery because of the following reason.

Generally, the positive electrode and the negative electrode must be disposed so that a mixed layer formed on the positive electrode (hereinafter referred to as "positive electrode mixed layer") always faces a mixed layer formed on the negative electrode (hereinafter referred to as "negative electrode mixed layer") in order that lithium ions extracted from the positive electrode mixed layer are inserted into the negative mixed layer. However, when the above coating defect in the positive electrode occurs, the negative electrode mixed layer does not always face the coating defect, so when charge and discharge are repeated without inserting lithium ions extracted from the coating defect into the negative electrode mixed layer, the lithium ions are deposited as lithium metal. The deposited lithium metal may pass through the separator, thereby resulting in an internal short circuit.

SUMMARY OF THE INVENTION

In view of the foregoing, it is an object of the present invention to provide an electrode manufacturing apparatus and a method of manufacturing an electrode in which an electrode capable of preventing the occurrence of an internal short circuit is manufactured.

A first electrode manufacturing apparatus according to the invention manufactures an electrode comprising a mixed layer disposed on a current collector, and comprises a coating means for coating a mixture on the current collector in a predetermined coating position so as to form the mixed layer, and a transferring means for transferring the current collector so as to pass through the coating position in a downward direction.

In a first method of manufacturing an electrode according to the invention, the electrode comprises a mixed layer disposed on a current collector, and the method comprises the step of transferring the current collector by a transferring means so as to pass through a predetermined coating position in a downward direction, and concurrently coating a mixture on the current collector in the coating position by a coating means so as to form the mixed layer.

A second electrode manufacturing apparatus according to the invention manufactures an electrode comprising a mixed layer disposed on a current collector, and comprises a coating means for supplying a mixture in a predetermined direction in a predetermined coating position so as to coat the mixture on the current collector, thereby forming the mixed layer, and a mixture interrupting means for pulling a built-up mixture between the current collector and the coating means back in a direction opposite to a direction where the mixture is supplied, when the coating means interrupts coating of the mixture.

In a second method of manufacturing an electrode according to the invention, the electrode comprises a mixed layer disposed on a current collector, and a mixture is supplied in a predetermined direction in a predetermined coating position so as to coat the mixture on the current collector, thereby the mixed layer is formed by a coating means, and a built-up mixture between the current collector and a coating means is pulled back by a mixture interrupting means in a direction opposite to a direction where the mixture is supplied, when coating of the mixture is interrupted.

In the first electrode manufacturing apparatus and the first method of manufacturing an electrode according to the invention, the current collector is transferred so as to pass through the predetermined coating position in a downward direction. Therefore, just after coating of the mixture is interrupted, the built-up mixture between the current collector and the coating means is pulled by the current collector not in an upward direction but in a downward direction. As a result, a non-forming region where no mixed layer is formed can be prevented from being coated with the mixture.

In the second electrode manufacturing apparatus and the second method of manufacturing an electrode according to the invention, when coating of the mixture is interrupted, the built-up mixture between the current collector and the coating means is pulled back in a direction opposite to a direction where the mixture is supplied, so the possibility that the built-up mixture between the current collector and the coating means is pulled by the current collector, and is adhered to a coating end portion of the mixture is eliminated, thereby linearity of the coating end portion is improved. Further, there is no possibility that when the built-up mixture between the current collector and the coating means is pulled by the current collector, the mixture in the coating means is pulled out together to be adhered to a non-forming region where no mixed layer is formed, therefore the non-forming region can be prevented from being coated with the mixture.

Other and further objects, features and advantages of the invention will appear more fully from the following description.

DETAILED DESCRIPTION OF THE PREFERRED EMBODIMENTS

Preferred embodiments of the present invention will be described in more detail below referring to the accompanying drawings.

First Embodiment

Figure 1:
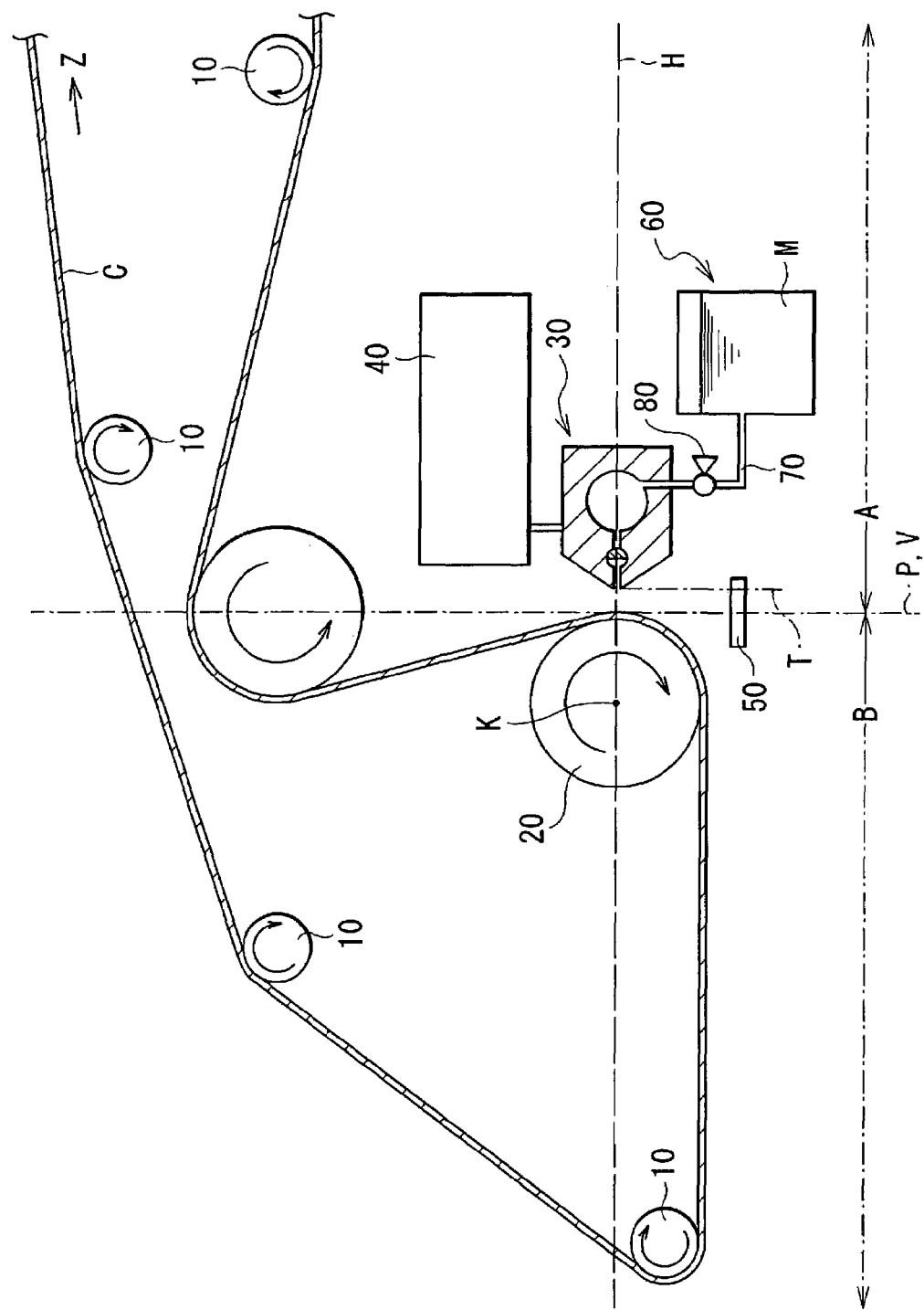
FIG. 1 is a schematic view of an electrode manufacturing apparatus according to a first embodiment of the invention.
Figure 2:
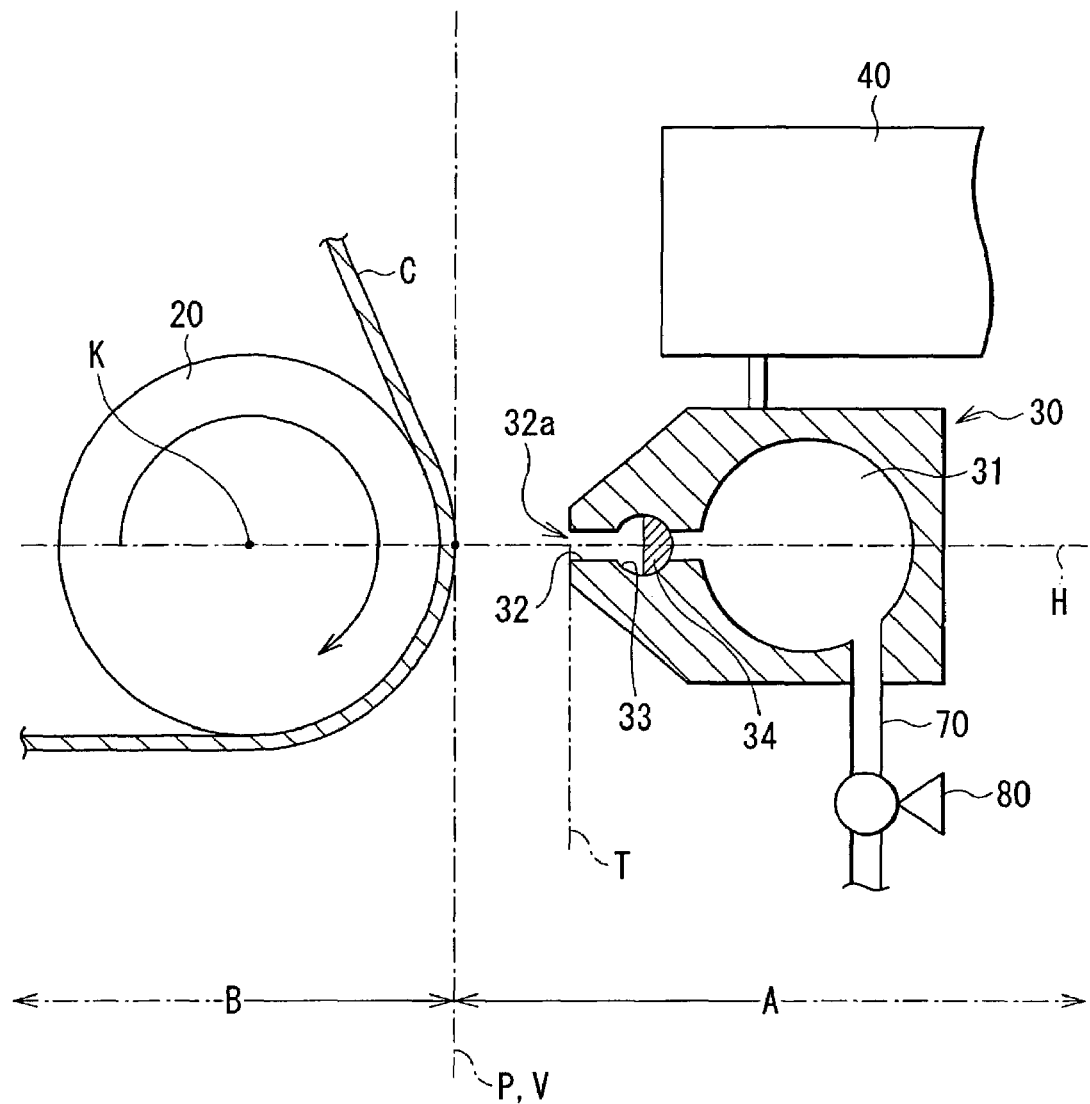
FIG. 2 is an enlarged sectional view of a main part of the electrode manufacturing apparatus shown in FIG. 1.

At first, referring to FIGS. 1 and 2, a structure of an electrode manufacturing apparatus according to a first embodiment of the invention will be described below. FIG. 1 shows a schematic view of the electrode manufacturing apparatus according to the embodiment, and FIG. 2 shows an enlarged view of a main part of the electrode manufacturing apparatus shown in FIG. 1. "A method of manufacturing an electrode" according to the invention is embodied by an operating mechanism of the electrode manufacturing apparatus according to the embodiment, so it will be also described below. The same holds true in the following second through fourth embodiments.

The electrode manufacturing apparatus according to the embodiment manufactures an electrode (positive electrode, negative electrode) mounted in a battery mainly through coating a mixture M on a strip-shaped current collector C in a coating position P at predetermined intervals so as to form a mixed layer. As shown in FIG. 1, the electrode manufacturing apparatus comprises guide rolls 10 and a reference roll 20 (transferring means) which transfer the current collector C, a coating head 30 (coating means) which coats the mixture M on the current collector C, an attaching/detaching mechanism 40 which attaches and detaches the coating head 30 to/from the current collector C, and a mixture receiver 50 (collecting means) which collects the dropped mixture M in two regions A (one side region) and B (the other side region) divided by a vertical plane V including the coating position P. Herein, the "coating position P" indicates a position on the current collector C where the mixture M is coated by the coating head 30.

The guide rolls 10 rotate corresponding to a direction (a direction of an arrow Z in the drawing) where the current collector C is transferred so as to transfer the current collector C along a predetermined transfer route. The disposed number of guide rolls 10 can be freely set in accordance with the transfer route of the current collector C.

When the reference roll 20 transfers the current collector C together with the guide rolls 10, the reference roll 20 rotates around a revolving shaft K in a clockwise direction especially during transfer of the current collector C so as to pass the current collector C through the coating position P in a downward direction, and lead the current collector C having passed through the coating position P to the region B, and the reference roll 20 is disposed in the region B.

The coating head 30 coats the mixture M on the current collector C in the coating position P so as to form the mixed layer, and comprises, for example, a closed slot die. The coating head 30 is disposed in the region A, and is movable between the coating position P where the mixture M is coated on the current collector C and a withdrawal position T recessed from the coating position P by, for example, the attaching/detaching mechanism 40. The coating head 30 is connected to, for example, a tank 60 for storing the mixture M and a pump 80 for supplying the mixture M stored in the tank 60 to the coating head 30 through a supply pipe 70. The coating position P is disposed in, for example, the same horizontal plane H as the position of the revolving shaft K of the reference roll 20 and the withdrawal position T. A coating direction of the coating head 30 (an extending direction of a flow path 32 to be described later) is, for example, parallel to the horizontal plane H. FIG. 1 shows a state that the coating head 30 is positioned in the withdrawal position T.

As shown in FIG. 2, the coating head 30 has, for example, a mechanism which contains the mixture M in a coating material holder 31, and emits the mixture M contained in the coating material holder 31 from a coating outlet 32a through the flow path 32. A switching shaft 34 installed in a bearing portion 33 is disposed at a midpoint in the flow path 32, and the switching shaft 34 is driven to open or close the flow path 32, thereby the emission of the mixture M by the coating head 30 can be switched on and off. A distance between the current collector C in a transfer state and the coating outlet 32a is, for example, approximately 0.1 mm to 0.5 mm in the case where the coating head 30 is disposed in the coating position P, and approximately 0.5 mm to 2 mm in the case where the coating head 30 is disposed in the withdrawal position T.

Next, referring to FIG. 1, the structure of the electrode manufacturing apparatus will be described below.

The attaching/detaching mechanism 40 moves, for example, a connecting portion connected to the coating head 30 so as to move the coating head 30 between the coating position P and the withdrawal position T.

The mixture receiver 50 is a containing part for containing the dropped mixture M when the mixture M is coated on the current collector C by the coating head 30, and is formed in, for example, a vessel shape. The mixture receiver 50 is disposed directly below and close to the coating position P.

The electrode manufacturing apparatus according to the embodiment comprises not only the above-described components but also other components (not shown), for example, a transfer driving source for transferring the current collector C, a power source for driving a series of components and so on.

Figure 3:
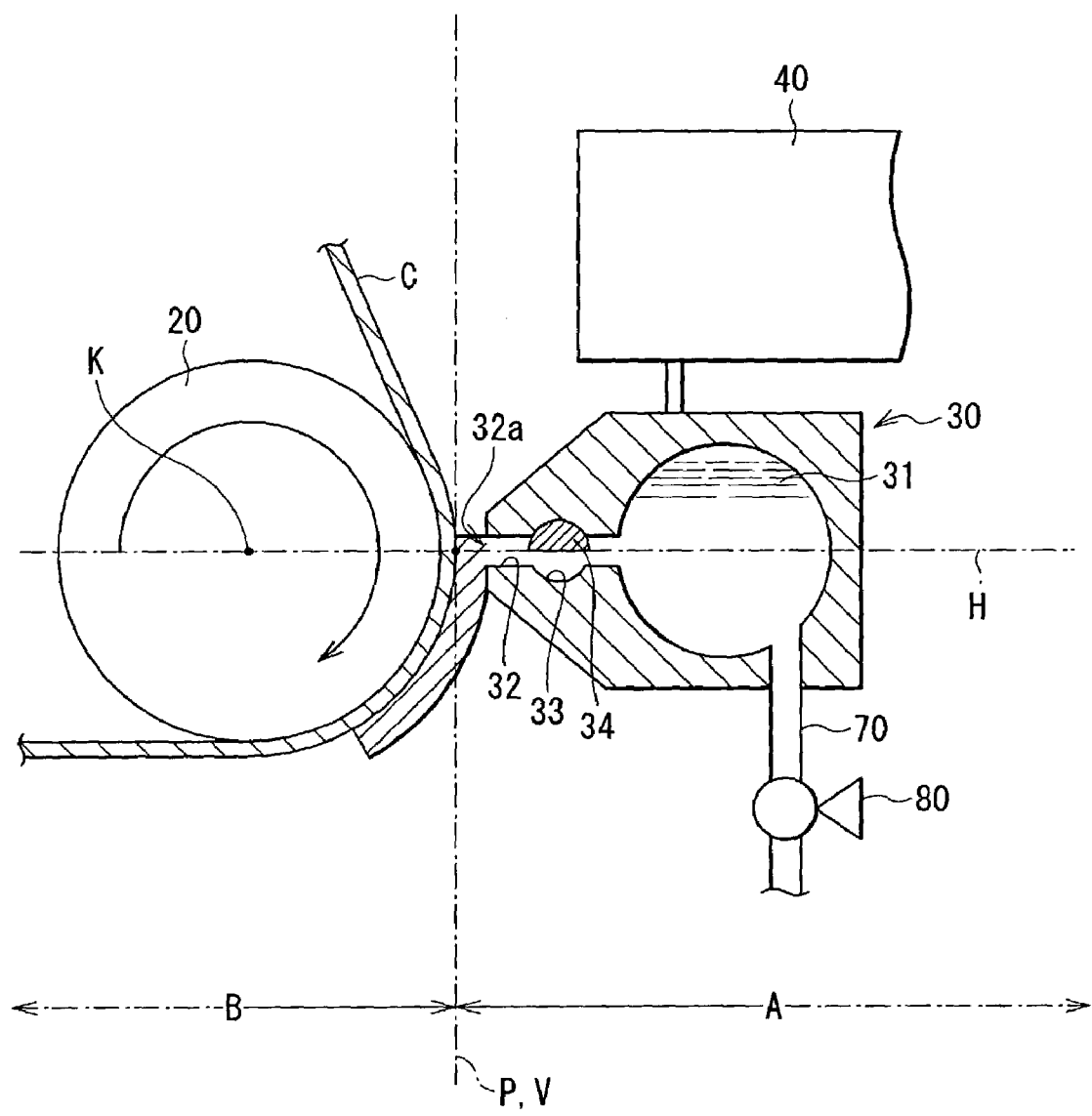
FIG. 3 is a sectional view for describing actions of the electrode manufacturing apparatus according to the first embodiment of the invention.
Figure 4:
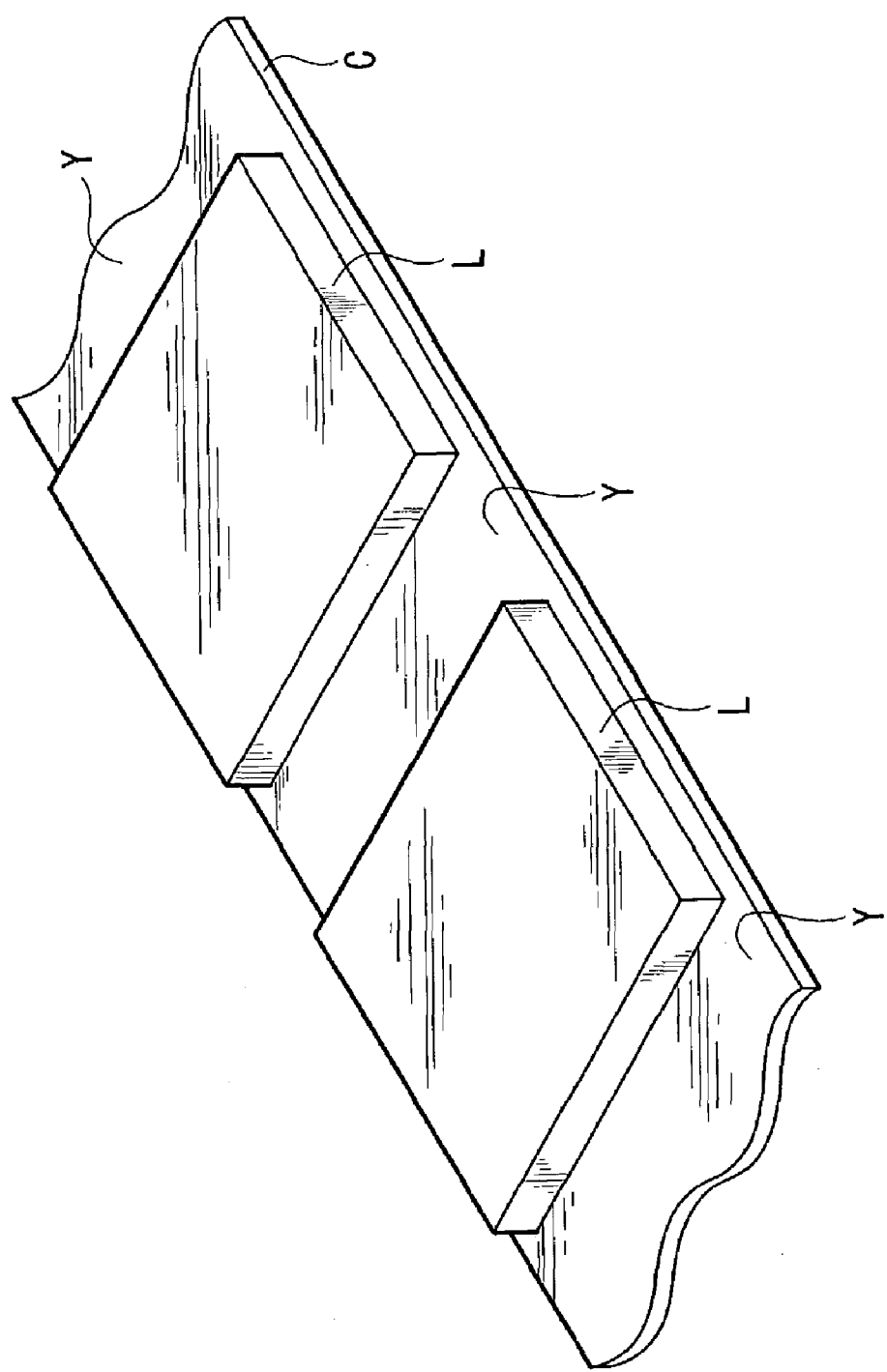
FIG. 4 is a perspective view showing an outline structure of an electrode formed by the electrode manufacturing apparatus according to the first embodiment of the invention.

Next, referring to FIGS. 1 through 4, actions of the electrode manufacturing apparatus according to the embodiment will be described below. FIG. 3 is an illustration for describing the actions of the electrode manufacturing apparatus, and corresponds to FIG. 2. FIG. 4 shows an outline structure of an electrode formed by the electrode manufacturing apparatus.

In the electrode manufacturing apparatus, in a state before coating (refer to FIG. 2), the coating head 30 is positioned in the withdrawal position T. In this state, for example, the switching shaft 34 blocks the flow path 32, so the coating head 30 falls in a coating standby state.

During coating (refer to FIG. 3), at first, in a state in which the current collector C is transferred by the guide rolls 10 and the reference roll 20 along the circumferential surfaces thereof so as to pass through the coating position P in a downward direction, the coating head 30 moves from the withdrawal position T to the coating position P by using a driving mechanism of the attaching/detaching mechanism 40. Then, the switching shaft 34 is driven to open the flow path 32, and the pump 80 is driven, thereby the mixture M can be emitted from the coating outlet 32a. Then, the coating head 30 coats the mixture M on the current collector C so as to form a mixed layer L. Next, after the switching shaft 34 blocks the flow path 32 so as to suspend a coating action by the coating head 30, the coating head 30 moves from the coating position P to the withdrawal position T so as to recover the state before coating (refer to FIG. 2).

The above-described series of actions are repeated so as to intermittently coat the mixture M on the current collector C being transferred, so, as shown in FIG. 4, the mixed layer L and a non-forming region Y are formed in alternate order.

Figure 5:
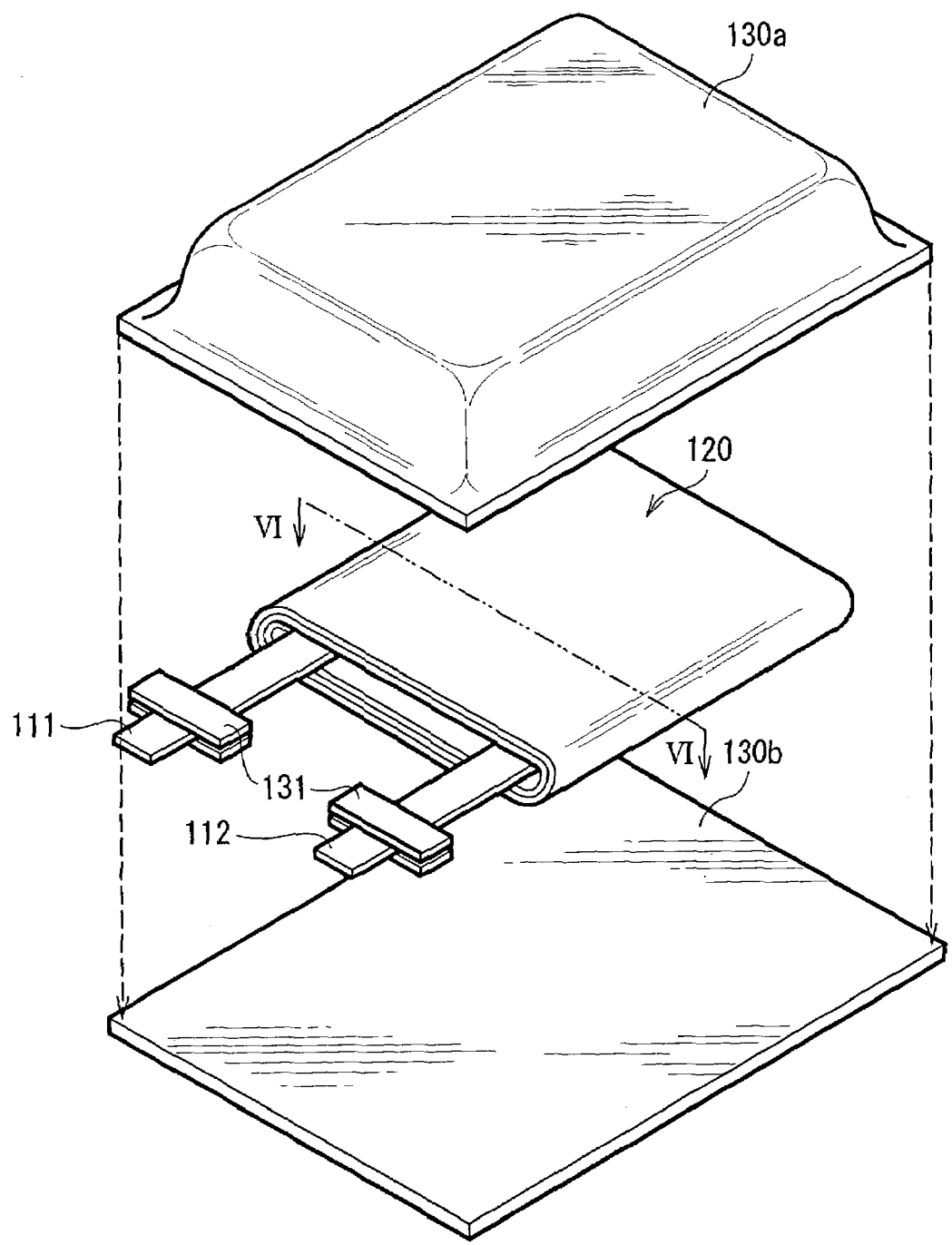
FIG. 5 is an exploded perspective view of a secondary battery comprising an electrode manufactured by the electrode manufacturing apparatus according to the first embodiment of the invention.
Figure 6:
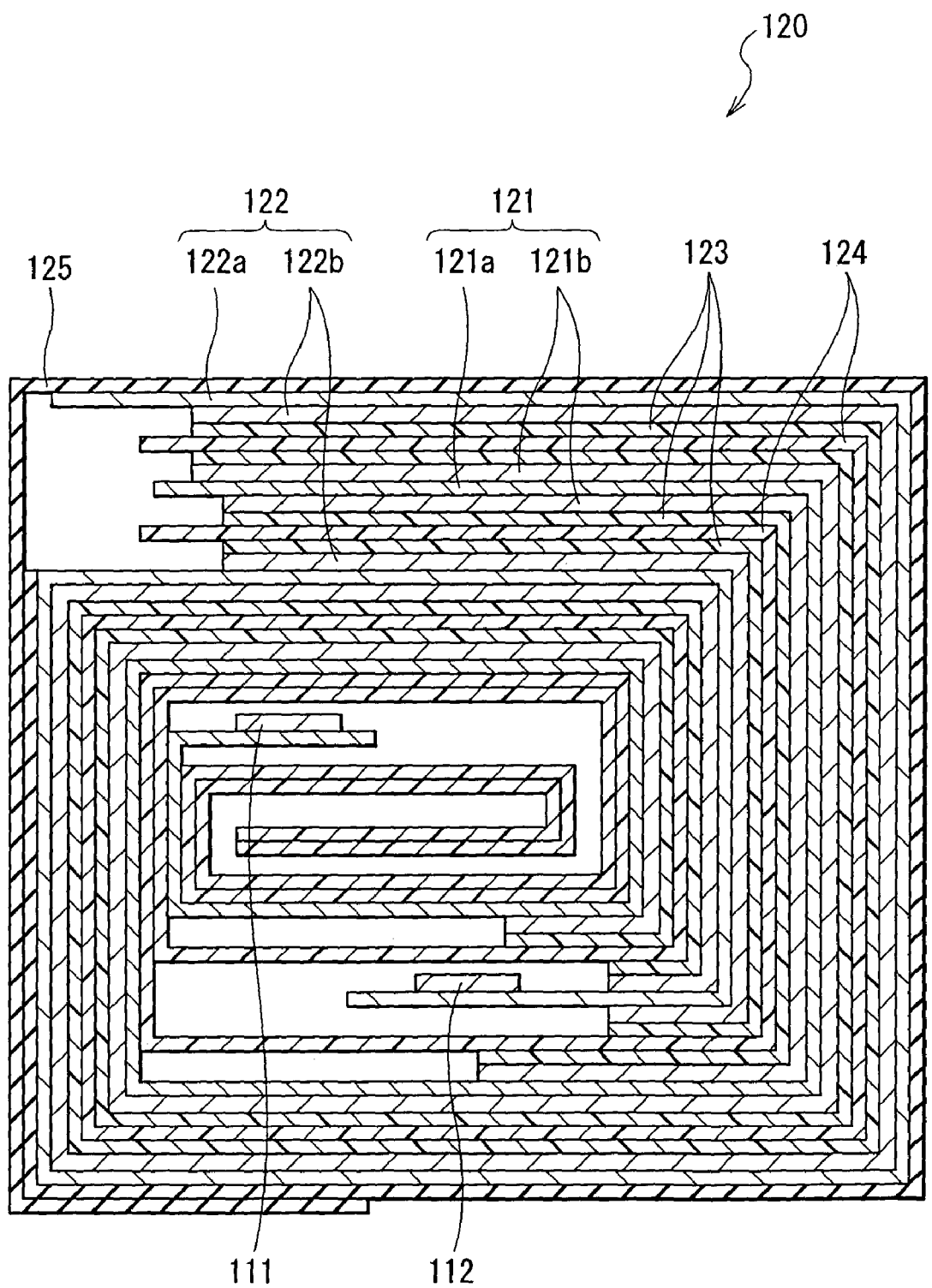
FIG. 6 is a sectional view of a winding electrode body taken along a line VI-VI of FIG. 5.

Next, referring to FIGS. 5 and 6, a structure of a battery in which the electrode manufactured by the electrode manufacturing apparatus according to the embodiment is mounted will be described below. FIG. 5 shows an exploded view of an outline structure of the battery, and FIG. 6 shows a sectional structure of a main part (winding electrode body) of the battery shown in FIG. 5 taken along a line VI-VI.

The battery comprises a winding electrode body 120 to which a positive electrode lead 111 and a negative electrode lead 112 are attached enclosed by packages 130a and 130b. The winding electrode body 120 includes, for example, a wound laminate of a positive electrode 121 and a negative electrode 122 with an electrolyte layer 123 made of a gel electrolyte and a separator 124 in between. An outermost portion of the negative electrode 122 is protected by a protective tape 125, and the positive electrode lead 111 and the negative electrode lead 112 are sufficiently kept in contact with the packages 130a and 130b with, for example, an adhesion film 131 in between.

The positive electrode 121 is, for example, an electrode manufactured by the above-described electrode manufacturing apparatus which is cut between the mixed layers, and has a strip-shaped current collector 121a and mixed layers 121b disposed on both sides of the current collector 121a. The positive electrode lead 111 is disposed on a non-forming region of the positive electrode 121.

The current collector 121a is made of, for example, metallic foil such as aluminum (Al) foil, nickel (Ni) foil, stainless foil or the like.

The mixed layer 121b is made of, for example, a positive electrode active material, an electronic conductor such as carbon black, graphite or the like if necessary, and a binder such as polyvinylidene fluoride. As the positive electrode active material, metal oxide, metal sulfide or a specific polymeric material is suitable, and one kind or a mixture of two or more kinds selected from them is used. The positive electrode active material is suitably selectable depending upon intended use of the battery, however, in order to improve its energy density, lithium (Li) composite oxide principally containing $Li_xMO_2$ (the value of x depends upon a charge/discharge state of the battery, and is generally $0.05 \leq x \leq 1.12$) is preferable. In the composition formula, one kind or more of transition metal is preferable as M, and at least one selected from the group consisting of cobalt (Co), nickel and manganese (Mn) is more preferable. As specific examples of such lithium composite oxide, $LiNi_yCo_{1-y}O_2$ ($0 \leq y \leq 1$) or $LiMn_2O_4$ is cited.

As in the case of the positive electrode 121, the negative electrode 122 is, for example, an electrode manufactured by the above-described electrode manufacturing apparatus, and being cut between the mixed layers, and the negative electrode 122 has a strip-shaped current collector 122a and mixed layers 122b disposed on both sides of the current collector 122a. The negative electrode lead 112 is disposed on a non-forming region of the negative electrode 122.

The current collector 122a is made of, for example, metallic foil such as copper (Cu) foil, nickel foil, stainless foil or the like.

The mixed layer 122b is made of, for example, a negative electrode active material, and a binder such as polyvinylidene fluoride if necessary. As the negative electrode active material, lithium metal or a negative electrode material capable of inserting and extracting lithium is cited. As a material capable of inserting and extracting lithium, a carbon material, metal oxide, a polymeric material or the like is cited. Among them, as the carbon material, for example, artificial graphite, natural graphite, graphitizing carbon or non-graphitizing carbon is cited. Further, as the metal oxide, iron oxide, ruthenium oxide, molybdenum oxide, tungsten oxide, tin oxide or the like is cited, and as the polymeric material, polyacetylene, polypyrrole or the like is cited.

As the negative electrode material capable of inserting and extracting lithium, an elementary substance, an alloy or a compound of a metal element or metalloid element which can form an alloy with lithium is cited. Further, as the alloy, in addition to an alloy of two kinds or more of metal elements, an alloy of one kind or more of metal elements and one kind or more of metalloid elements is included. As the composition of the alloy, there are a solid solution, an eutectic (eutectic mixture), an intermetallic compound or a coexistence of two kinds or more selected from them.

As the metal element or the metalloid element which can form an alloy with lithium, for example, magnesium (Mg), boron (B), arsenic (As), aluminum (Al), gallium (Ga), indium (In), silicon (Si), germanium (Ge), tin (Sn), lead (Pb), antimony (Sb), bismuth (Bi), cadmium (Cd), silver (Ag), zinc (Zn), hafnium (Hf), zirconium (Zr), yttrium (Y), palladium (Pd) and platinum (Pt) are cited. As an alloy or a compound thereof, for example, an alloy or a compound represented by a chemical formula $Ma_sMb_tLi_u$ or a chemical formula $Ma_p\text{-}Mc_qMd_r$ is cited. In these chemical formulas, Ma represents at least one kind selected from the metal elements and the metalloid elements which can form an alloy with lithium, Mb represents at least one kind selected from metal elements and metalloid elements except for lithium and Ma, Mc represents at least one kind selected from nonmetal elements, and Md represents at least one kind selected from metal elements and metalloid elements except for Ma. Further, the values of s, t, u, p, q and r are s>0, t≧0, u≧0, p>0, q>0 and r≧0, respectively.

Among the metal elements and the metalloid elements, an elementary substance, an alloy or a compound of a Group 4B metal element or a Group 4B metalloid element is preferable, and silicon, tin, an alloy of silicon or tin, or a compound of silicon or tin is more preferable. They may have a crystalline structure or an amorphous structure.

As specific examples of such alloy or such compound, LiAl, AlSb, CuMgSb, $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ (0<v≦2), $SnO_w$ (0<w≦2), $SnSiO_3$, LiSiO, LiSnO or the like is cited.

The electrolyte layer 123 made of a gel electrolyte is formed on the mixed layers 121*b* and 122*b*. The electrolyte layer 123 is a high polymer holding an electrolyte which is, for example, a non-aqueous solvent with lithium salt as electrolyte salt dissolved therein.

As the non-aqueous solvent, for example, ethylene carbonate, propylene carbonate, butylene carbonate, γ-butyrolactone, γ-valerolactone, diethoxyethane, tetrahydrofuran, 2-methyltetrahydrofuran, 1,3-dioxolane, methyl acetate, methyl propionate, dimethyl carbonate, diethyl carbonate, ethyl methyl carbonate, 2,4-difluoroanisole, 2,6-difluoroanisole or 4-bromoveratrole is cited, and one kind or a mixture of two kinds or more selected from them is used.

As the lithium salt, for example, $LiPF_6$, $LiBF_4$, $LiCF_3SO_3$, $LiN(CF_3SO_2)_2$ or $LiN(C_2F_5SO_2)_2$ is cited, and one kind or a mixture of two kinds or more selected from them is used.

As the polymeric material, for example, polyvinylidene fluoride, polyacrylonitrile, polyethylene oxide, polypropylene oxide, polymethacrylonitrile or the like is cited, and one kind or a mixture of two kinds or more selected from them is used depending upon type of usage.

The separator 124 isolates, for example, the positive electrode 121 and the negative electrode 122 from each other so as to pass the lithium ions through while preventing a short circuit of current resulting from contact between both electrodes, and is made of an insulating thin film having high ion permeability and a predetermined mechanical strength. More specifically, a porous film made of polyolefin-based material such as polypropylene or polyethylene, or a porous film made of an inorganic material such as a nonwoven fabric made of ceramic is used, and a laminate of two kinds or more of the porous films may be used. The thickness of the separator 124 is preferably from 1 μm to 20 μm inclusive in consideration of the mechanical strength and the volumetric capacity of battery.

According to the electrode manufacturing apparatus and the method of manufacturing an electrode of the embodiment, when the above-described electrode is formed, the current collector C is transferred in a downward direction by the reference roll 20 in the coating position P, so because of the following reason, the non-forming region Y of the current collector C can be preventing from being coated with the mixture M, and an internal short circuit in the battery can be prevented. As a result, an improvement in yields, a reduction in market complaints, and an improvement in safety can be achieved.

Figure 7:
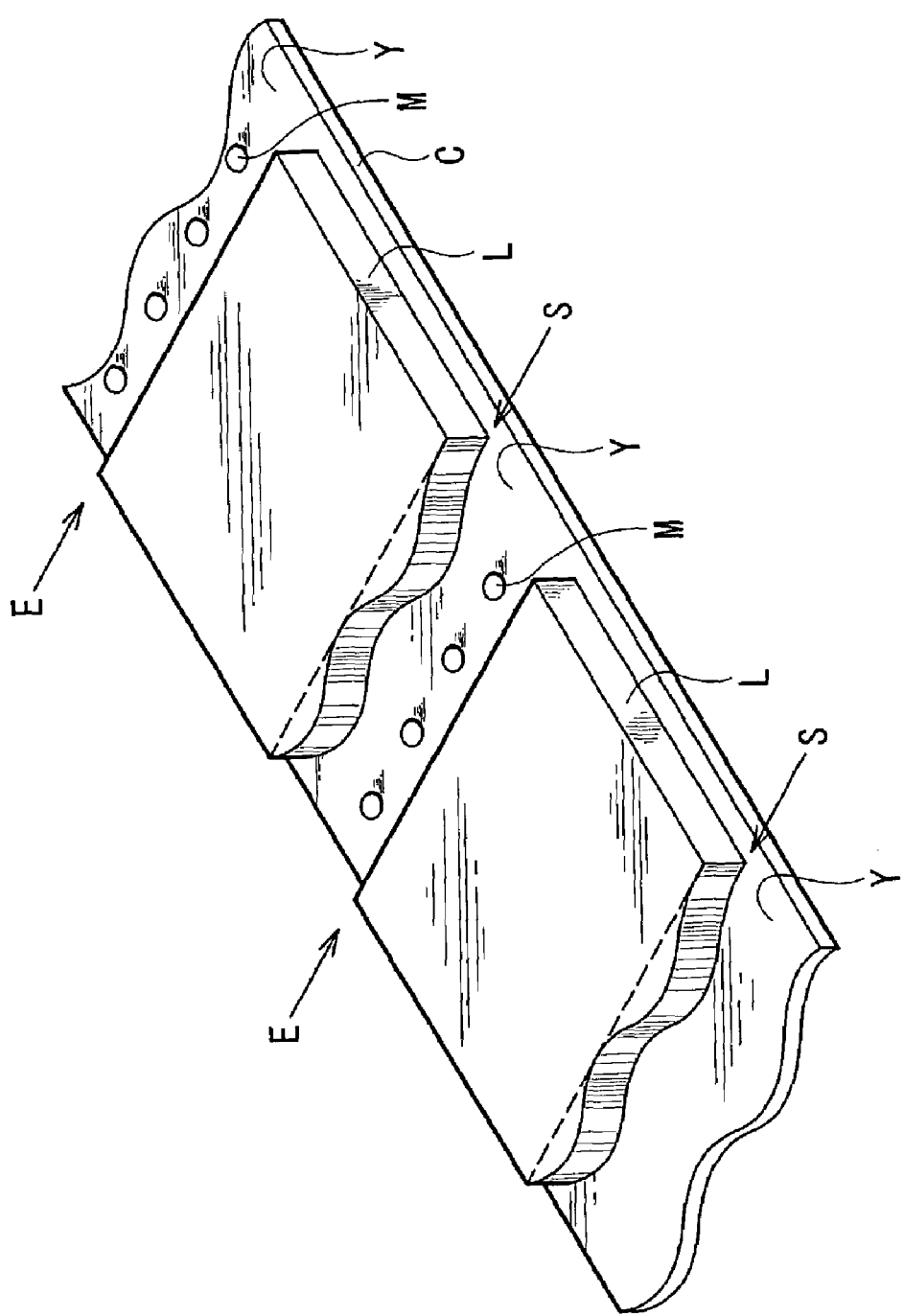
FIG. 7 is a perspective view showing an outline structure of an electrode formed by an electrode manufacturing apparatus as a comparative example of the electrode manufacturing apparatus according to the first embodiment of the invention.

As described above, when an unnecessary mixed layer L is formed on the non-forming region Y, an internal short circuit in the battery may occur resulting from the existence of the unnecessary mixed layer L, so when the electrode is formed, it is required not to coat the mixture M on the non-forming region Y. One of the reasons why the mixture M is coated on the non-forming region Y is, for example, that the mixture M emitted from the coating head 30 is adhered to the coating outlet 32*a*. When the mixture M is adhered to the coating outlet 32*a*, as shown in FIG. 7, resulting from the mixture M adhered to the coating outlet 32*a*, the linearity of a coating start portion S is decreased, so the unnecessary mixed layer L is formed on the non-forming region Y.

When the mixture M is coated on the current collector C by the coating head 30, as a method of transferring the current collector C, for example, a technique that the current collector C is transferred in a upward direction in the coating position P through rotating the reference roll 20 counterclockwise around the revolving shaft K is considered. However, when the current collector C is transferred in an upward direction, just after coating of the mixture M is interrupted, a mixture M (hereinafter simply referred to as "built-up mixture M") built up between the current collector C and the coating outlet 32*a* is pulled upward by the current collector C, so the position of the built-up mixture M is higher than the position of the coating outlet 32*a*. Thereby, when the built-up mixture M is dropped, the built-up mixture M is more likely to be adhered to the coating outlet 32*a*, so the mixture M may be coated on the non-forming region Y.

On the other hand, in the embodiment, as shown in FIGS. 1 through 3, the current collector C is transferred in a downward direction in the coating position P, so just after coating of the mixture M is interrupted, the built-up mixture M is pulled downward by the current collector C. In this case, unlike the case where the current collector C is transferred in an upward direction in the coating position P, the position of the built-up mixture M is lower than the position of the coating outlet 32*a*, so even if the built-up mixture M is dropped, the adhesion of the mixture M to the coating outlet 32*a* can be prevented. Therefore, the non-forming region Y can be prevented from being coated with the mixture M, and as a result, the occurrence of an internal short circuit in the battery can be prevented.

Moreover, in the embodiment, the current collector C having passed through the coating position P is led to the region B by the reference roll 20, so the current collector C having passed through the coating position P is not transferred from the region B to the region A, but is transferred in the region B. In this case, unlike the case where the current collector C having passed through the coating position P is transferred from the region B to the region A, no built-up mixture M is dropped on the current collector C having passed through the coating position P, so in this point of view, the non-forming region Y can be prevented from being coated with the built-up mixture M.

Further, in the embodiment, the coating position P is disposed in the same horizontal plane H as the position of the revolving shaft K of the reference roll 20, so in this point of view, the non-forming region Y can be prevented from being coated with the mixture M because of the following reason. For example, when the coating head 30 is disposed so that the coating position P is higher than the horizontal plane H, the current collector C is transferred below the coating outlet 32a. In this case, just after coating of the mixture M, when the mixture M remained in the flow path 32 is dropped from the coating outlet 32a, as shown in FIG. 7, the unnecessary mixture M may be adhered to a region of the current collector C at the rear of a coating end portion E of the mixture M. Like a decrease in the linearity of the above-described coating start portion S, the adhesion of the unnecessary mixture M leads an internal short circuit in the battery. On the contrary, in the embodiment, the coating head 30 is disposed so that the coating position P is disposed in the horizontal plane H, so the current collector C is not transferred below the coating outlet 32a. Therefore, even if the mixture M is dropped just after coating, the adhesion of the mixture M to the non-forming region Y can be prevented.

Still further, in the embodiment, the mixture receiver 50 for containing the dropped built-up mixture M is comprised, so the mixture receiver 50 collects the dropped built-up mixture M so as to prevent from adhering the built-up mixture M to a portion where scattering or coating of the mixture M is unnecessary.

Further, in the embodiment, the vessel-shaped mixture receiver 50 for containing the dropped mixture M is comprised, but it is not necessarily limited to this. For example, instead of the mixture receiver 50, a suction nozzle for sucking the dropped mixture M may be comprised. In this case, an area where the mixture M is collected can be expanded by using a suction power of the suction nozzle, so collecting efficiency of the mixture M can be improved. Further, an area where the mixture M is dropped can be reduced by using the suction power of the suction nozzle, so the adhesion of the dropped mixture M to the non-forming region Y can be prevented.

Second Embodiment

Next, a second embodiment of the invention will be described below.

Figure 8:
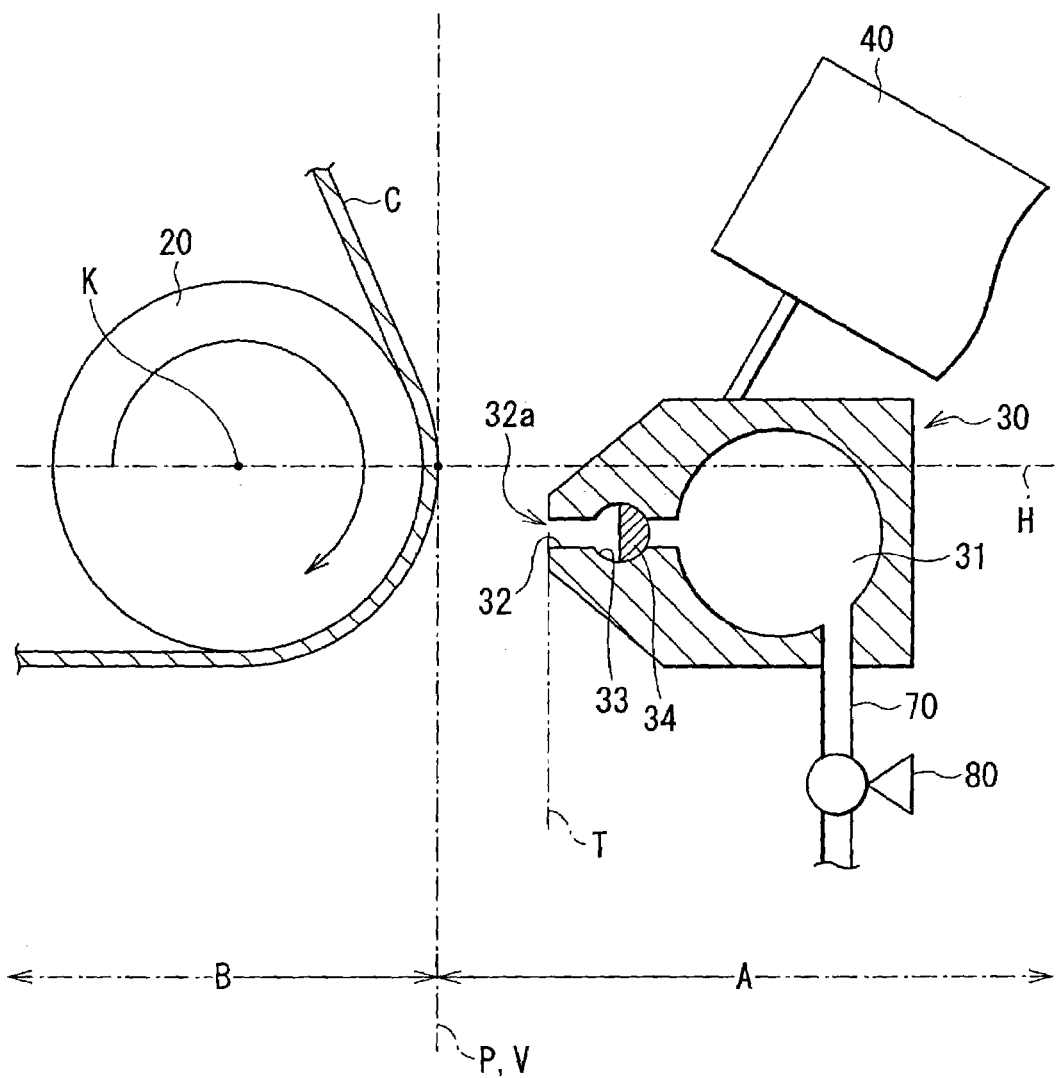
FIG. 8 is a sectional view of a main part of an electrode manufacturing apparatus according to a second embodiment of the invention.

FIG. 8 shows an enlarged view of a main part of an electrode manufacturing apparatus according to the second embodiment of the invention, and corresponds to FIG. 2 in the first embodiment.

In the electrode manufacturing apparatus, unlike the case of the first embodiment in which the withdrawal position T is disposed in the same horizontal plane H as the coating position P and the revolving shaft K, the withdrawal position T is disposed obliquely below the coating position P. In other words, by use of the driving mechanism of the attaching/detaching mechanism 40, the coating head 30 moves obliquely upward from the withdrawal position T to the coating position P and obliquely downward from the coating position P to the withdrawal position T.

In the electrode manufacturing apparatus, as in the case of the first embodiment, in the state that the current collector C is transferred by the reference roll 20 so as to pass through the coating position P in a downward direction, the coating head 30 repeats the coating action of the mixture M while moving between the withdrawal position T and the coating position P, so that, as shown in FIG. 4, the mixed layer L and the non-forming region Y are formed in alternate order.

Thus, according to the embodiment, the withdrawal position T is disposed obliquely below the coating position P, so compared to the first embodiment, the adhesion of the built-up mixture M to the non-forming region Y can be prevented more effectively because of the following reason.

In the case of the first embodiment in which the withdrawal position T and the coating position P are disposed in the same horizontal plane H, and the coating head 30 moves only in a horizontal direction without displacing in a height direction, just after coating of the mixture M by the coating head 30 is interrupted, the built-up mixture M built up between the current collector C and the coating outlet 32a is pulled downward by the current collector C transferred downward only on a side closer to the current collector C. In this case, the built-up mixture M is built up in a region between the coating outlet 32a and the current collector C transferred toward below the coating outlet 32a, and the built-up mixture M gets closer to the non-forming region Y just after the mixed layer L formed on the current collector C, so the built-up mixture M may be adhered to the non-forming region Y.

On the other hand, in the embodiment, the coating head 30 moves obliquely downward from the coating position P to the withdrawal position T, so just after coating of the mixture M is interrupted, the built-up mixture M built up between the current collector C and the coating outlet 32a is pulled downward by the current collector C on a side closer to the current collector C, and is pulled downward by the coating head 30, which follows the built-up mixture M to move downward, on a side closer to the coating outlet 32a as well. In this case, unlike the case of the first embodiment in which the built-up mixture M gets closer to the non-forming region Y, the built-up mixture M is kept away from the non-forming region Y, so the possibility that the built-up mixture M is adhered to the non-forming region Y is reduced. Therefore, the non-forming region Y can be prevented from being coated with the built-up mixture M.

The structure, actions, functions, effects, modifications and so on of the electrode manufacturing apparatus according to the embodiment are equivalent to those according to the first embodiment except for the above-described characteristic parts.

Third Embodiment

Next, a third embodiment of the invention will be described below.

Figure 9:
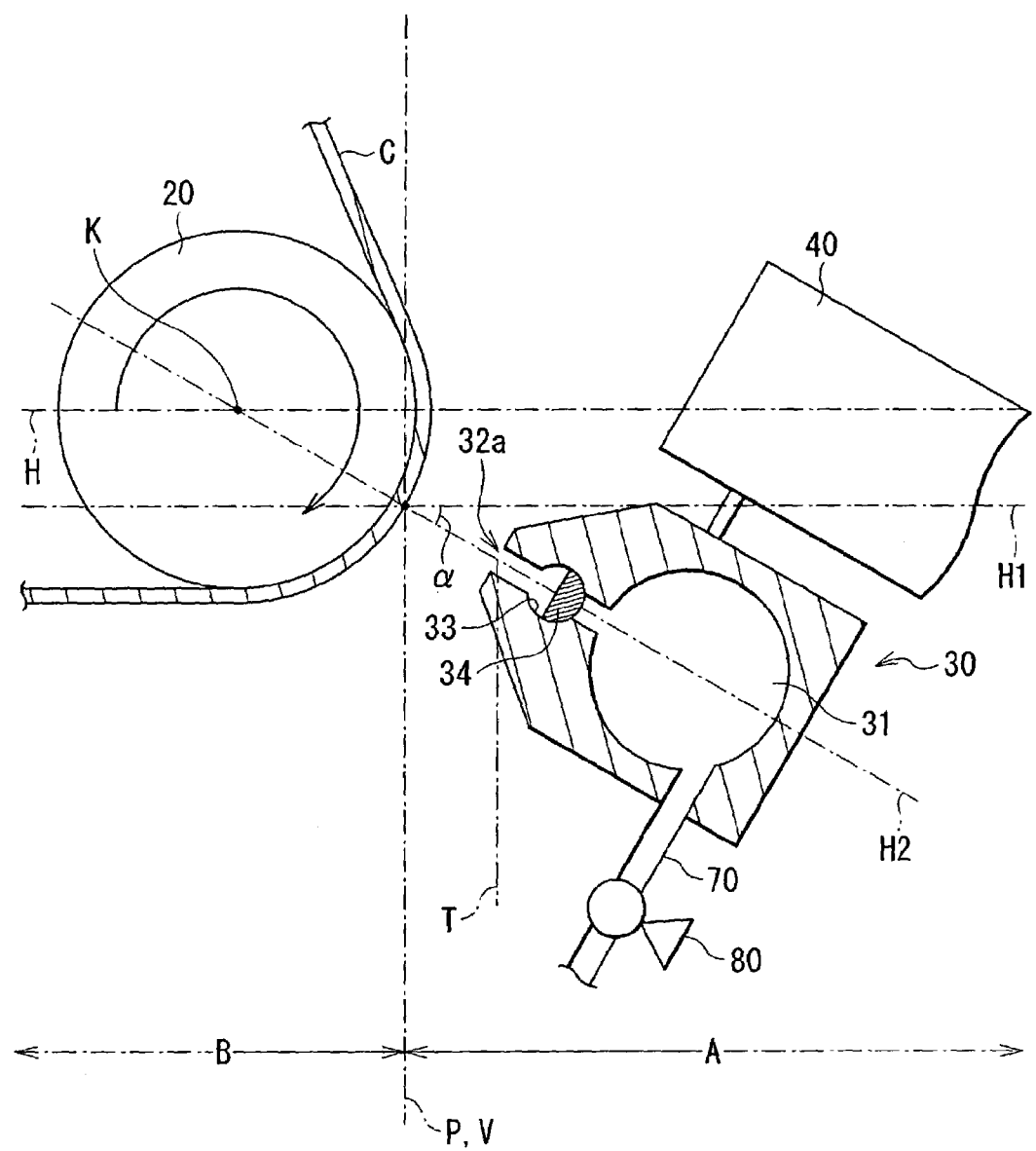
FIG. 9 is a sectional view of a main part of an electrode manufacturing apparatus according to a third embodiment of the invention.

FIG. 9 shows an enlarged view of a main part of an electrode manufacturing apparatus according to the third embodiment of the invention, and corresponds to FIG. 2 in the first embodiment.

In the electrode manufacturing apparatus, unlike the first embodiment in which the coating position P is disposed in the same horizontal plane H as the revolving shaft K of the reference roll 20, the coating position P is disposed below the revolving shaft K of the reference roll 20. Further, unlike the first embodiment in which a coating direction of the coating head 30 forms the horizontal plane H, the coating direction of the coating head 30 is inclined downward at an angle (inclined angle) $\alpha$ of 30° from a horizontal plane H1 including the coating position P. The inclined angle $\alpha$ is not necessarily limited to 30°, and can be freely set within a range approximately from 0° to 30°. Further, the coating direction of the coating head 30 is in parallel to a horizontal plane H2 including the revolving shaft K and the coating position P. The withdrawal position T is disposed obliquely below the coating position P, as in the case of the second embodiment.

In the electrode manufacturing apparatus, as in the case of the first embodiment, in the state that the current collector C is transferred by the reference roll 20 so as to pass through the coating position P in a downward direction, as shown in FIG. 4, the mixed layer L and the non-forming region Y are formed on the current collector C by the coating head 30 in alternate order.

Thus, according to the embodiment, the inclined angle α of the coating head 30 is within a range approximately from 0° to 30°, so even if the coating direction of the coating head 30 is inclined downward with respect to the horizontal plane H1, the non-forming region Y can be prevented from being coated with the built-up mixture M because of the following reason.

When the inclined angle α is larger than 30° so that a difference in height between the positions of the built-up mixture M and the coating outlet 32a becomes too large, the built-up mixture M may be dropped to be adhered to the coating outlet 32a. When the built-up mixture M is adhered to the coating outlet 32a, as described in the first embodiment, the built-up mixture M is coated on the non-forming region Y.

On the other hand, in the embodiment, when the inclined angle α is within a range approximately from 0° to 30°, a difference in height between the positions of the built-up mixture M and the coating outlet 32a is adequately reduced, so the possibility that the dropped built-up mixture M is adhered to the coating outlet 32a can be reduced. Therefore, even in the case where the coating direction of the coating head 30 is inclined downward with respect to the horizontal plane H1, the non-forming region Y can be prevented from being coated with the built-up mixture M.

The structure, actions, functions, effects, modifications and so on of the electrode manufacturing apparatus according to the embodiment are equivalent to those according to the first and the second embodiments except for the above-described characteristic parts.

Fourth Embodiment

Figure 10:
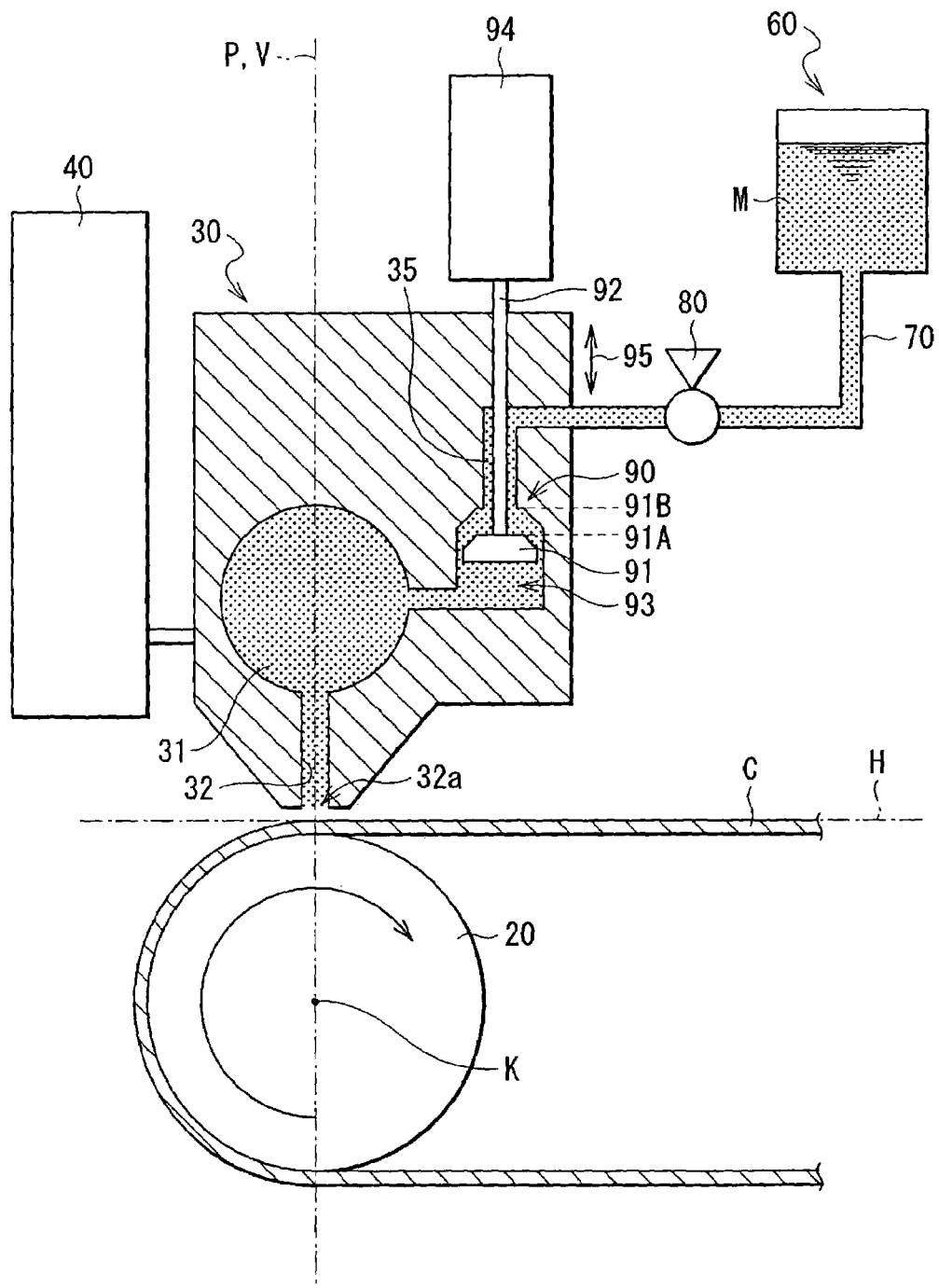
FIG. 10 is a sectional view of an electrode manufacturing apparatus according to a fourth embodiment of the invention.

Next, a fourth embodiment of the invention will be described below with reference to FIG. 10. In the embodiment, when the coating head 30 interrupts coating of the mixture M, the built-up mixture M is pulled back to a direction opposite to a direction where the mixture M is supplied.

In the electrode manufacturing apparatus according to the embodiment, unlike the first, the second and the third embodiments, a direction where the reference roll 20 passes the current collector C through the coating position P is not specifically limited. For example, as shown in FIG. 10, the direction can be in a direction parallel to the horizontal plane H. In addition, a required number of guide rolls (not shown) are disposed together with the reference roll 20 according to the transfer route of the current collector C.

The coating head 30 comprises, for example, a closed slot die, and is movable between the coating position P where the mixture M is coated on the current collector C and the withdrawal position T (refer to FIG. 1) receded from the coating position P by, for example, the attaching/detaching mechanism 40. The coating position P is disposed in, for example, the same vertical plane V as the position of the revolving shaft K of the reference roll 20 and the withdrawal position T. The coating direction of the coating head 30 (an extending direction of the flow path 32) is parallel to the vertical plane V. A direction where the mixture M is supplied in the coating position P (a direction where the mixture M moves in the flow path 32) is, for example, in a vertically downward direction. FIG. 10 shows a state that the coating head 30 is positioned in the coating position P.

A mixture interrupting mechanism 90 (mixture interrupting means) is integrally built in the coating head 30, instead of the bearing portion 33 (refer to FIG. 2) and the switching shaft 34 (refer to FIG. 2). When the coating head 30 interrupts coating of the mixture M so as to form the non-forming region Y, the mixture interrupting mechanism 90 pulls the built-up mixture M back in a direction opposite to the direction where the mixture is supplied, for example, in a vertically upward direction in the coating position P so that the mixture M is drawn into the coating head 30.

The mixture interrupting mechanism 90 is disposed in, for example, upstream of the flow path 35 from the coating material holder 31 in the coating head 30, and has an shut-off valve 91 with a valve rod 92 connected thereto. The shut-off valve 91 is contained in a containing hole (housing) 93 disposed in the flow path 35. A driving mechanism 94 is disposed in an end portion of the valve rod 92 which is not connected to the shut-off valve 91, and the valve rod 92 is driven in a direction where the valve rod 92 goes into the containing hole 93 or a direction where the valve rod 92 comes out from the containing hole 93 as shown by an arrow 95. Thus, as the valve rod 92 goes into or comes out from the containing hole 93, the valve rod 92 relatively moves the shut-off valve 91 between an open position 91A where the shut-off valve 91 is moved away from the containing hole 93 so as to pass the mixture M through and an interrupting position 91B where the shut-off valve blocks the containing hole 93 so as to interrupt the mixture M. FIG. 10 shows a state that the shut-off valve 91 is disposed in the open position 91A.

Figure 11:
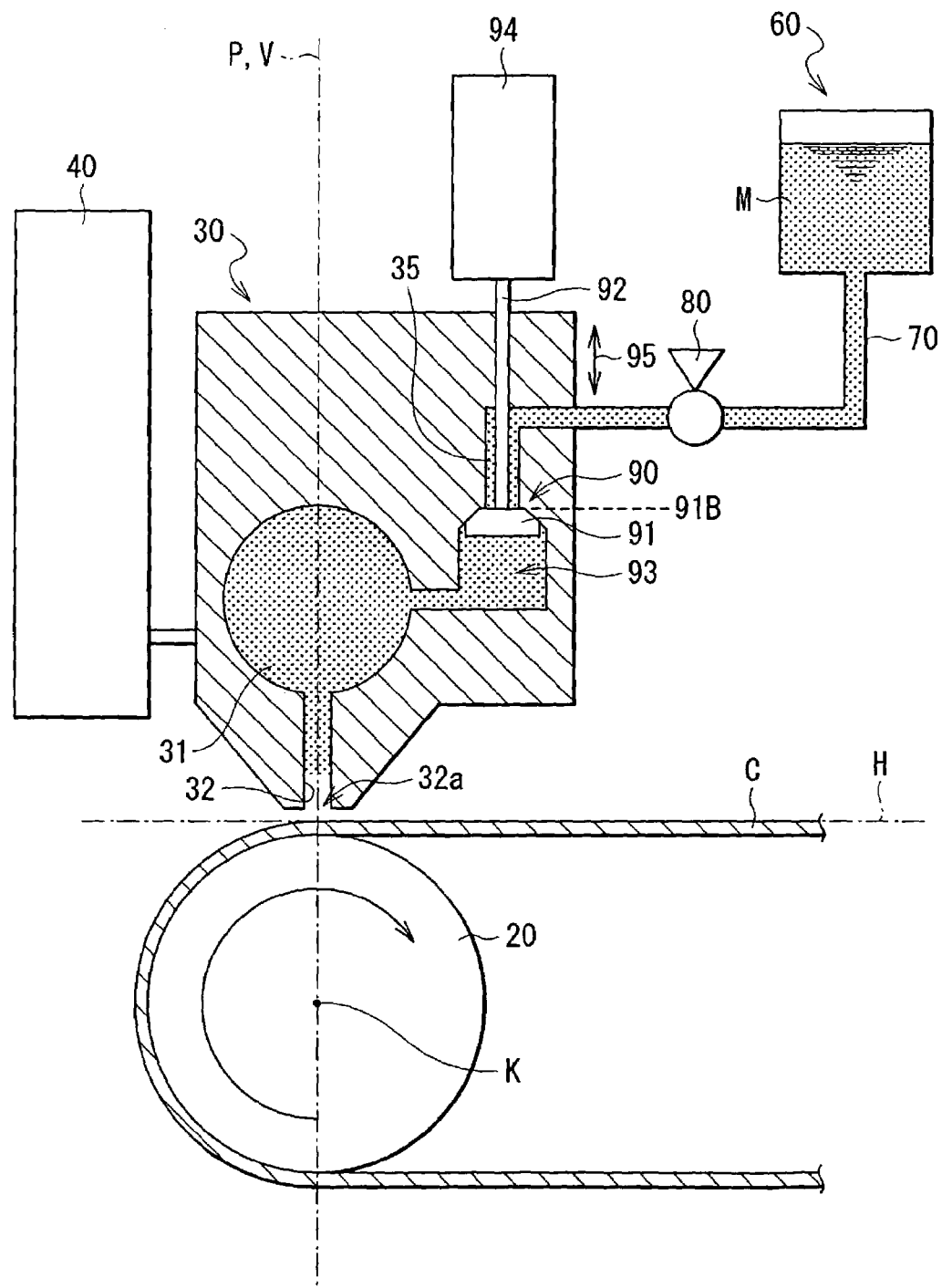
FIG. 11 is a sectional view showing a state that a shut-off valve shown in FIG. 10 is in an interrupting position.

Next, actions of the electrode manufacturing apparatus according to the embodiment will be described below with reference to FIGS. 10 and 11. FIG. 11 shows a state that the shut-off valve 91 is disposed in the interrupting position 91B.

In the electrode manufacturing apparatus, during coating (refer to FIG. 10), the valve rod 92 is driven so as to go into the containing hole 93, and accordingly, the shut-off valve 91 moves to the open position 91A to open the flow path 32, and the pump 80 is driven, thereby the mixture M can be emitted from the coating outlet 32a, so the coating head 30 supplies the mixture M in a vertically downward direction in the coating position P so as to coat the mixture M on the current collector C. Thereby, the mixed layer L is formed.

When the coating head 30 interrupts coating of the mixture M, the pump 80 stops so as to stop supplying the mixture M from the tank 60 to the coating head 30 via the supply pipe 70. At the same time, the valve rod 92 is driven so as to come out from the containing hole 93, and accordingly, the shut-off valve 91 moves to the interrupting position 91B to block the flow path 35. At this time, in order to prevent the occurrence of a coating defect, it is preferable that the valve rod 92 comes out from the containing hole 93 as quickly as possible.

When the shut-off valve 91 moves to the interrupting position 91B, a portion of the valve rod 92 which is entered into the containing hole 93 comes out from the containing hole 93, so the whole mixture M built up between the current collector C and the shut-off valve 91 of the mixture interrupting mechanism 90 is pulled back in a direction opposite to a direction where the mixture M is supplied, that is, in a vertically upward direction by the volume of the portion. Thereby, the built-up mixture M is pulled back in a vertically upward direction into the flow path 32 of the coating head 30, and an end of the mixture M is retracted into the coating head 30. Therefore, unlike a conventional manner, the possibility that the built-up mixture M is pulled by the current collector C being transferred in a horizontal direction, and is adhered to a coating end portion E (refer to FIG. 7) is eliminated, so linearity of the coating end portion is improved. Further, unlike the conventional manner, there is no possibility that when the built-up mixture M is pulled by the current collector C, the mixture M in the flow path 32 of the coating head 30 is pulled out together with the built-up mixture M to be adhered to the non-forming region Y, so the non-forming region Y can be prevented from being coated with the mixture M.

The structure, actions, functions, effects, modifications and so on of the electrode manufacturing apparatus according to the embodiment are equivalent to those according to the first embodiment.

Thus, in the embodiment, the mixture M is supplied in the coating position P in a predetermined direction, for example, in a vertically downward direction so as to be coated on the current collector C, thereby, the mixed layer L is formed, and when coating of the mixture M is interrupted, the built-up mixture M is pulled back in a direction opposite to a direction where the mixture M is supplied, for example, in a vertically upward direction. Therefore, the possibility that the built-up mixture M is pulled by the current collector C, and is adhered to the coating end portion E, so the linearity of the coating end portion is improved. Further, there is no possibility that when the built-up mixture M is pulled by the current collector C, the mixture M in the flow path 32 of the coating head 30 is pulled out together with the built-up mixture M to be adhered to the non-forming region Y, so the non-forming region Y can be prevented from being coated with the mixture M.

The invention is described with reference to some embodiments, but the invention is not limited to these embodiments, and can be variously modified. For example, in the first, the second and the third embodiments, as long as the current collector can be transferred so as to pass through the coating position in a downward direction, the invention is freely modified.

Moreover, in the fourth embodiment, the case where the mixture interrupting mechanism 90 is integrally built in the coating head 30 is described, but, for example, the mixture interrupting mechanism 90 may be disposed on the supply pipe 70 outside the coating head 30. However, when a distance between the mixture interrupting mechanism 90 and the coating outlet 32a of the coating head 30 is shorter, an effect that the mixture interrupting mechanism 90 pulls the built-up mixture M back into the coating head 30 is enhanced. Therefore, it is preferable that the mixture interrupting mechanism 90 is integrally built in the coating head 30.

Further, in the fourth embodiment, the case where the coating head 30 supplies the mixture M in a vertically downward direction in the coating position P, and the mixture interrupting mechanism 90 pulls the built-up mixture M back in a vertically upward direction, but a direction where the coating head 30 supplies the mixture M in the coating position P is not limited to a vertically downward direction, and can be adequately determined depending upon a direction where the current collector C is transferred.

In addition, in the above-described embodiments, the case where the mixture M is coated on the current collector C is described, but the invention is applicable to the case where any coating material other than the mixture is coated on any body-to-be-coated other than the current collector.

As described above, according to the electrode manufacturing apparatus or a method of manufacturing an electrode of an aspect of the invention, the current collector is transferred so as to pass through a predetermined coating position in a downward direction, so just after coating of the mixture is interrupted, the built-up mixture between the current collector and the coating means is pulled downward by the current collector. Therefore, the position of the built-up mixture is lower than the position of a portion of the coating means where the mixture is emitted. Thereby, even if the mixture is dropped, the adhesion of the dropped mixture to the portion of the coating means where the mixture is emitted can be prevented, and as a result, the non-forming region where the mixed layer is not formed can be prevented from being coated with the mixture. Therefore, for example, when a battery comprises an electrode manufactured by the method of manufacturing an electrode and the electrode manufacturing apparatus, an internal short circuit in the battery can be prevented. As a result, an improvement in yields, a reduction of market complaints, and an improvement in safety can be achieved.

According to the electrode manufacturing apparatus or the method of manufacturing an electrode of the aspect of the invention, the current collector having passed through the coating position is led to one side region where the coating means is disposed and the other side region opposed to the side region, so the current collector having passed through the coating position is not transferred from one side region to the other side region, but is transferred in the other side region only. Therefore, no mixture is dropped on the current collector having passed through the coating position, so the adhesion of the mixture to the non-forming region of the current collector where the mixed layer is not formed can be prevented.

Further, according to the electrode manufacturing apparatus or the method of manufacturing an electrode of the aspect of the invention, the coating position is disposed in the same horizontal plane as the position of the revolving shaft of the transferring means or below the position of the revolving shaft, so the current collector is never transferred below a portion of the coating means where the mixture is emitted. Therefore, even if the mixture is dropped just after coating, the adhesion of the dropped mixture to the non-forming region of the current collector where the mixed layer is not formed can be prevented, thereby the non-forming region of the current collector where the mixed layer is not formed can be prevented from being coated with the mixture.

Moreover, according to the electrode manufacturing apparatus or the method of manufacturing an electrode of the aspect of the invention, a coating direction of the coating means is inclined downward at an angle of 30° or less with respect to a horizontal plane including the coating position, so a difference in height between the position of the built-up mixture between the current collector and the coating means and the position of a portion of the coating means where the mixture is emitted is adequately reduced, thereby the possibility that the dropped built-up mixture is adhered to the portion of the coating means where the mixture is emitted can be reduced. Therefore, also in the case where the coating direction of the coating means is inclined downward with respect to the horizontal plane including the coating position, the non-forming region of the current collector where the mixed layer is not formed can be prevented from being coated with the built-up mixture.

Further, according to the electrode manufacturing apparatus or the method of manufacturing an electrode of the aspect of the invention, the withdrawal position is disposed obliquely below the coating position, so just after coating of the mixture is interrupted, the built-up mixture between the current collector and the coating means is pulled downward by the current collector on a side closer to the current collector, and is pulled downward by the coating means, which follows the built-up mixture to move in a downward direction, on a side closer to the portion of the coating means where the mixture is emitted. As a result, the built-up mixture is kept away from the non-forming region of the current collector where the mixed layer is not formed, so the possibility that the built-up mixture is adhered to the non-forming region is reduced. Therefore, the non-forming region can be prevented from being coated with the built-up mixture more effectively.

According to the electrode manufacturing apparatus or the method of manufacturing an electrode of the aspect of the invention, the mixture dropped during coating is collected by the coating means, so scattering or coating of the mixture can be prevented from being adhered to a portion where the adhesion of the mixture is not required.

Specifically, according to the electrode manufacturing apparatus or the method of manufacturing an electrode of the aspect of the invention, the dropped mixture is sucked, so an area where the mixture is collected can be expanded, thereby efficiency of collecting the mixture can be improved. Further, an area where the mixture is dropped can be reduced by use of a suction power, so the dropped mixture can be prevented from being adhered to the non-forming region of the current collector where the mixed layer is not formed.

According to the electrode manufacturing apparatus or the method of manufacturing an electrode of another aspect of the invention, the mixture is supplied in a predetermined direction in a predetermined coating position so as to be coated on the current collector, thereby the mixed layer is formed, and when coating of the mixture is interrupted, the built-up mixture between the current collector and the coating means is pulled back in a direction opposite to a direction where the mixture is supplied, so the possibility that the built-up mixture between the current collector and the coating means is pulled by the current collector, and is adhered to the coating end portion of the mixture is eliminated. Thereby, the linearity of the coating end portion is improved. Further, there is no possibility that when the built-up mixture between the current collector and the coating means is pulled by the current collector, the mixture in the coating means is pulled out together to be adhered to the non-forming region where the mixed layer is not formed, so the non-forming region can be prevented from being coated with the mixture. Therefore, for example, when a battery comprises an electrode manufactured by the method of manufacturing an electrode and the electrode manufacturing apparatus, an internal short circuit in the battery can be prevented. As a result, an improvement in yields, a reduction of market complaints and an improvement in safety can be achieved.

Specifically, according to the electrode manufacturing apparatus or the method of manufacturing an electrode of another aspect of the invention, the mixture interrupting means is integrally built in the coating means, so a distance between the mixture interrupting means and the coating means is shorter, thereby an effect that the mixture interrupting means pulls the built-up mixture between the current collector and the coating means back into the coating means can be enhanced.

Obviously many modifications and variations of the present invention are possible in the light of the above teachings. It is therefore to be understood that within the scope of the appended claims the invention may be practiced otherwise than as specifically described.

What is claimed is:

1. A method of manufacturing an electrode comprising a mixed layer disposed on a one side of a current collector via a movable coating head, the method comprising:
    transferring the current collector by a transferring means so as to pass through a predetermined coating position in a downward direction, and concurrently coating a mixture on the current collector in the coating position via a coating head so as to form the mixed layer; wherein the current collector is moved downward and horizontally away from the coating head immediately after receiving the coating mixture, and
    moving the coating head with a horizontal component of motion between the coating position and a withdrawal position disposed at a distance from the coating position in a direction away from the current collector, and
    providing a switching device disposed in a flow path of said coating head which drives between an open and a blocking position in order to further control the deposition of the mixture on the current collector.

2. A method of manufacturing an electrode according to claim 1, wherein
    the coating head is disposed in one side region of the transferring means, the transferring means embodied as a roller mechanism around which the current collector travels, and wherein the current collector has a direction of motion that is substantially vertically downward at the location at which material from the coating head is applied to the current collector, and wherein
    the transferring means adjusts a direction where the current collector is transferred so as to lead the current collector both downward and away from the coating means, immediately after the current collector passes through the coating position in a downward direction.

3. A method of manufacturing an electrode according to claim 2, wherein
    as the transferring means is embodied as a rotatable roller with a revolving shaft is used, and the current collector is transferred along a circumferential surface of the roller.

4. A method of manufacturing an electrode according to claim 3, wherein
    the coating position is disposed in the same horizontal plane as the position of the revolving shaft of the transferring means, or below the position of the revolving shaft.

5. A method of manufacturing an electrode according to claim 4, wherein
    a coating position of the coating head is located at an angle of 30° or less with respect to a horizontal plane including an axis of rotation for the transferring means and wherein the current collector moves around the roller such that the current collector direction of motion is altered from a vertical direction toward horizontal.

6. A method of manufacturing an electrode according to claim 1, wherein
    the withdrawal position is disposed in the same horizontal plane as the coating position.

7. A method of manufacturing an electrode according to claim 1, wherein
    the withdrawal position is disposed obliquely below the coating position.

8. A method of manufacturing an electrode according to claim 1, further comprising the step of:
    collecting the mixture dropped during coating through the coating head by a collecting means.

9. A method of manufacturing an electrode according to claim 8, wherein
    as the collecting means, a means for sucking the mixture dropped is used.

10. A method of manufacturing an electrode according to claim 1, wherein
    as the mixture, a material capable of inserting and extracting lithium is used.

11. A method of manufacturing an electrode according to claim 1, wherein the deposition or the mixed material takes place as the collector travels around a guide roll, such that one side of the collector abuts the guide roll while the other side of the collector faces the coating head.

12. A method of manufacturing an electrode comprising a mixed layer disposed on one side of a current collector, wherein
    a mixture is supplied in a predetermined direction in a predetermined coating position so as to coat the mixture on one side of the current collector, thereby the mixed layer is formed by a coating head, a built-up mixture between the current collector and the coating head is pulled back by a mixture interrupting means in a direction opposite to a direction where the mixture is supplied, when coating of the mixture is interrupted, wherein a single valve structure pulls back the mixture when interrupting a flow of the mixture, and the mixture interrupting means comprises:

a containing hole disposed in a mixture flow path, a shut-off valve disposed in the containing hole, and a valve rod being connected to the shut-off valve, and relatively moving the shut-off valve with respect to the containing hole between an open position where the shut-off valve is moved away from the containing hole so as to pass the mixture through and an interrupting position where the shut-off valve blocks the containing hole so as to interrupt the mixture.

13. A method of manufacturing an electrode according to claim 12, wherein the mixture is supplied in a vertically downward direction in the coating position, and when coating of the mixture is interrupted, the built-up mixture is pulled back in a vertically upward direction.

14. The method of manufacturing an electrode of claim 5, wherein the coating position is located generally in a same horizontal plane as the axis of rotation for the transferring means and the coating head moves downward and horizontally away from the coating position.

15. The method of manufacturing an electrode of claim 5, wherein the coating position is located at a position between 20 and 30° below the horizontal plane of the axis of rotation for the transferring means and the coating head moves downward and horizontally away from the coating position.

16. A method of manufacturing an electrode comprising a mixed layer disposed on one side of a current collector, the method comprising the step of:

transferring the current collector by a transferring means so as to pass through a predetermined coating position in a downward direction, and concurrently coating a mixture on one side of the current collector in the coating position by a coating head so as to form the mixed layer; wherein the current collector is moved downward and horizontally away from the coating means immediately after receiving the coating mixture and a switching means disposed in a flow path of said coating head drives between an open and a blocking position in order to further control the deposition of the mixture on the current collector.

17. A method of manufacturing an electrode according to claim 16, wherein a coating position of the coating head is located at an angle of 30° or less with respect to a horizontal plane including an axis of rotation for the transferring means and wherein the current collector moves around the roller such that the current collector direction of motion is altered from a vertical direction toward horizontal.

18. A method of manufacturing an electrode according to claim 16, wherein the deposition of the mixed material takes place as the collector travels around a guide roll, such that one side of the collector abuts the guide roll while the other side of the collector faces the coating head.

* * * * *